US008023942B2

(12) United States Patent
Kumar et al.

(10) Patent No.: US 8,023,942 B2
(45) Date of Patent: *Sep. 20, 2011

(54) NETWORK-BASED SYSTEM AND METHOD FOR GLOBAL ROAMING

(75) Inventors: Gandarvakottai V. Kumar, Hyderabad (IN); Harish Amilineni, Hyderabad (IN); Mohan Kumar, Hyderabad (IN); Prakash K. Senapati, Hyderabad (IN)

(73) Assignee: Megasoft Limited, Banjara Hills, Hyderabad (IN)

( * ) Notice: Subject to any disclaimer, the term of this patent is extended or adjusted under 35 U.S.C. 154(b) by 245 days.

This patent is subject to a terminal disclaimer.

(21) Appl. No.: 11/061,750

(22) Filed: Feb. 18, 2005

(65) Prior Publication Data
US 2005/0192007 A1      Sep. 1, 2005

Related U.S. Application Data

(60) Provisional application No. 60/545,142, filed on Feb. 18, 2004.

(51) Int. Cl.
*H04W 4/00* (2009.01)
*H04W 36/00* (2009.01)
(52) U.S. Cl. ......... 455/433; 455/434; 455/436; 455/445
(58) Field of Classification Search ............... 455/432.1, 455/433, 432.2, 432.3, 414.1, 436
See application file for complete search history.

(56) References Cited

U.S. PATENT DOCUMENTS

| | | | |
|---|---|---|---|
| 5,862,481 A | 1/1999 | Kulkarni et al. | |
| 6,094,578 A | 7/2000 | Purcell et al. | |
| 6,684,073 B1 | 1/2004 | Joss et al. | |
| 7,072,651 B2 | 7/2006 | Jiang et al. | |
| 7,096,014 B2 * | 8/2006 | Haverinen et al. | 455/432.1 |
| 7,505,769 B2 * | 3/2009 | Jiang | 455/432.3 |
| 2009/0122759 A1 * | 5/2009 | Kumar et al. | 370/331 |

FOREIGN PATENT DOCUMENTS

| | | |
|---|---|---|
| GB | 2 322 998 A | 9/1998 |
| WO | 99/55107 A | 10/1999 |

* cited by examiner

*Primary Examiner* — Charles Appiah
*Assistant Examiner* — Emem Stephen
(74) *Attorney, Agent, or Firm* — Weingarten, Schurgin, Gagnebin & Lebovici LLP

(57) ABSTRACT

A system and method of mobile communication roaming where a subscriber's home network and a roaming network used by the subscriber do not have a roaming agreement. The roaming network sends a "Send Authentication/Parameters" request to the home network via an intelligent roaming system on or attached to the backbone. The home network sends an authentication response to the "Send Authentication/Parameters" request from the home network to the roaming network via the backbone and intelligent roaming system. The roaming network sends a "Update Location" request from the roaming network to the intelligent roaming system. The visitor locator register (VLR) address in the "Update Location" request is replaced with the VLR address of the intelligent roaming system to create a modified update request. The modified update request is sent from the intelligent roaming system to the home network. The home network sends an update response to the modified update request to the roaming network via the backbone and intelligent roaming system.

15 Claims, 4 Drawing Sheets

NETWORK-BASED SYSTEM AND METHOD FOR GLOBAL ROAMING

This application is related to and claims priority from U.S. Provisional Patent Application Ser. No. 60/545,142 of G. V. Kumar, Harish Kumar, Mohan Kumar and Prakrash K. Senapati titled, "Global Instant Roaming Platform" filed Feb. 18, 2004. The entirety of this patent application is incorporated herein by reference.

BACKGROUND OF THE INVENTION

1. Field of the Invention

The present invention relates to a network-based method and system that enables roaming across local, regional, national, or international mobile communications networks.

2. Description of the Related Art

A plurality of mobile communication operators exist, and each provides communications access over a limited geographic area. Accordingly, access to communications services by a wireless communications user (also known as a "subscriber") to communications services provided directly by a subscriber's mobile communication operator (also known interchangeably herein as the "home operator") is limited to the geographic area and scope of the mobile communication operator (also referred to here as the "home network").

A subscriber wishing to obtain communications access when away from the home network (i.e., in areas not served by the home operator) can access communication services through third-party technologically compatible mobile communication operators (also known as "roaming operator"). The roaming operators provide communication services in additional geographic areas (also known as the "roaming network"). This ability to access non-home or roaming operators is generally known as "roaming." When the subscriber is roaming in a network that has a roaming agreement with the subscriber home network, then the roaming subscriber would be billed by the home network operator for use of the roaming network. If the home network does not have an agreement with the roaming network, then the subscriber generally cannot receive communications and is often required to arrange for payment to the roaming network operator to place a call.

Roaming provides a substantial source of revenue for operators in the mobile communication industry. Generally, the greater the range of roaming capabilities, the greater the use of the communications services by the subscribers, thereby enhancing revenues for the operators of communications services (generally known herein as "network operators" or "operator"). Typically, operators, which allow roaming, have business relationships (also known as "roaming relationships") that provide for additional fees incurred by subscribers per roaming use (in addition to subscription fees for home network use). Conventionally, each network operator engages in a time-consuming and tedious process of establishing individual roaming networks. Additionally, each network operator must regularly, and often manually, negotiate and settle usage fees and incurred costs based on roaming usage. This process is also time-consuming and tedious.

There has been a long felt need in the art for network operators to enable roaming in networks without agreements in near real time. Moreover, there is an unmet need in the art for a method and system for operators to provide global roaming access without engaging in time-consuming management of the roaming networks and to provide financial reconciliation in an efficient manner.

SUMMARY OF THE INVENTION

The present invention meets these unmet needs in the art, as well as others. The present invention is illustrated in two different embodiments of the systems and methods for enabling global roaming in an efficient manner of the invention. The two embodiments are titled: Multiple IMSI and Intelligence in Backbone and are discussed below.

Multiple IMSI

In the multiple IMSI embodiment ("first embodiment"), the present invention allows roaming between coordinated operators having bilateral roaming relationships (collectively known herein as the "alliance" or "alliance networks") and operators who do not have roaming agreements with the alliance. The present invention is integrated with alliance members, each of which typically has numerous roaming agreements with other operators. The combination of the total roaming area of each alliance member (and each alliance member's other roaming agreements) results in a large network of roaming coverage, thereby involving a substantial number of operators. In one variation, the scope of the network is global. Thus, the system and method of the present invention (also known interchangeably herein as "centralized system" or "system") provides instant roaming to multiple networks across continents using multiple international mobile station identifiers ("IMSI") from alliance networks.

By subscribing to the system of the present invention, a non-alliance operator can gain roaming access to alliance networks (i.e., networks having existing bilateral roaming relationships). Since some alliance network members are members of more than on alliance network, the non-alliance operator may gain roaming access to multiple alliance networks.

Intelligence in Backbone

Typically, mobile network operators use the Backbone network (using Signalling System No 7 ("SS7") or Internet Protocol ("IP")) to carry their signaling, data or voice signals to network operators (i.e., both home and non-home operators) at different geographical locations.

In this embodiment, the present invention allows roaming between operators using the Intelligence (also known as "intelligent roaming system") placed or enhanced at the Backbone (SS7 or IP). Consequently, bilateral roaming relationships among the operators are not required.

The present invention is integrated with the Backbone (SS7 or IP) which typically supports numerous operators by carrying their signaling, data or voice signals and thereby results in a large geographical area of roaming coverage.

In one variation of this embodiment, the scope of the network is global. Thus, the system and method of the present invention (also known interchangeably herein as "centralized system" or "system") provides roaming to multiple networks across continents using the Intelligence (intelligent roaming system) placed or enhanced in the Backbone of the operators network.

The present invention provides a system and method for mobile communication roaming where a subscriber's home network and the roaming network used by the subscriber do not have a roaming agreement. A roaming network sends a "Send Authentication/Parameters" request to a central system. The central system sends the "Send Authentication/Parameters" request to an alliance network. The alliance network sends the "Send Authentication/Parameters" request to a roaming gateway. The roaming gateway sends the "Send Authentication/Parameters" request to the home network. The home network sends an authentication response to the "Send Authentication/Parameters" request from to the subscriber network via the roaming network, alliance network, and central system. The roaming network sends a "Update Location" request to the central system. The central system replaces the visitor locator register (VLR) address in the "Update Location" request with the VLR address of the central system to create a modified update request. The central system sends the modified update request to the alliance network. The alliance network sends the modified update request to the roaming gateway. The roaming gateway replaces the visitor locator register (VLR) address in the modified update request with the VLR address of the roaming gateway to create a twice modified update request. The roaming gateway sends the twice modified update request to the home network. The home network sends an update response to the twice modified update request to the roaming network via the roaming gateway, alliance network, and central system.

The present invention provides a system and method for mobile communication roaming where a subscribers home network and the roaming network used by the subscriber do not have a roaming agreement. The subscriber's primary IMSI is replaced with a secondary IMSI on a mobile communication device. A roaming network sends a "Send Authentication/Parameters" request, based on the secondary IMSI, to a roaming gateway. The roaming gateway sends the "Send Authentication/Parameters" request to an alliance network. The alliance network sends the "Send Authentication/Parameters" request to a central system. The central system replaces the secondary IMSI with the primary IMSI in the "Send Authentication/Parameters" request. The central system sends the "Send Authentication/Parameters" request to the home network. The home network sends an authentication response to the "Send Authentication/Parameters" request to the roaming network via the central system, alliance network, and roaming gateway. The roaming network sends a "Update Location" request to the roaming gateway. The roaming gateway replaces the visitor locator register (VLR) address in the "Update Location" request with the VLR address of the roaming gateway to create a modified update request. The roaming gateway sends the modified update request to the alliance network. The alliance network sends the modified update request to the central system. The central system replaces the visitor locator register (VLR) address in the modified update request with the VLR address of the central system to create a twice modified update request. The central system sends the twice modified update request to the home network. The home network sends an update response to the twice modified update request to the roaming network via the central system, alliance network, and roaming gateway.

The present invention provides a system and method for mobile communication roaming where a subscriber's home network and a roaming network used by the subscriber do not have a roaming agreement, and the home network and the roaming network are connected with a backbone. The roaming network sends a "Send Authentication/Parameters" request to an intelligent roaming system on or attached to the backbone. The intelligent roaming system sends the "Send Authentication/Parameters" request to the home network. The home network sends an authentication response to the "Send Authentication/Parameters" request to the roaming network via the backbone and intelligent roaming system. The roaming network sends an "Update Location" request to the intelligent roaming system. The intelligent roaming system replacing the visitor locator register (VLR) address in the "Update Location" request with the VLR address of the intelligent roaming system to create a modified update request. The intelligent roaming system sending the modified update request to the home network. The home network sending an update response to the modified update request to the roaming network via the backbone and intelligent roaming system.

The present invention provides a system and method for mobile communication roaming where a subscribers home network and a roaming network used by the subscriber do not have a roaming agreement, and the home network and the roaming network are connected with a backbone. the subscribers primary IMSI is replaced with a secondary IMSI on a mobile communication device. The roaming network sends a "Send Authentication/Parameters" request, based on the secondary IMSI, to an intelligent roaming system on the backbone. The secondary IMSI is replaced with the primary IMSI in the "Send Authentication/Parameters" request. The intelligent roaming system sends the "Send Authentication/Parameters" request to the home network. The home network sends an authentication response to the "Send Authentication/Parameters" request to the roaming network via the backbone and intelligent roaming system. The roaming network sends a "Update Location" request to the intelligent roaming system. The intelligent roaming system replaces the visitor locator register (VLR) address in the "Update Location" request with the VLR address of the intelligent roaming system to create a modified update request. The intelligent roaming system sends the modified update request to the home network. The home network sends an update response to the modified update request to the roaming network via the intelligent roaming system and the backbone.

The present invention provides a system and method of billing a subscriber for roaming communications services when the subscribers home network and the roaming network do not have a roaming agreement. The roaming network rating the communication. The roaming network sending a tapout file to a central system settlement house. The central system settlement house consolidating the tapout files by alliance network. The central system settlement house sending the consolidated tapout files to the respective alliance network. The alliance network regenerating the tapout file. The alliance network sends the regenerated tapout file to the appropriate home network.

The present invention provides a system and method of billing a subscriber for roaming communications services when the subscribers home network and the roaming network do not have a roaming agreement. The roaming network rating the communication. The roaming network sending a tapout file to an alliance network. The alliance network settlement house consolidating the tapout files. The alliance network sending the consolidated tapout files to the central system. The secondary IMSI is translated to the primary IMSI. The central system regenerates the tapout file. The central system sends the regenerated tapout file to the appropriate home network.

The present invention provides a system and method of billing a subscriber for roaming communications services when the subscriber's home network and the roaming network do not have a roaming agreement. The roaming network rating the communication. The roaming network sends a tapout file to a central system settlement house. The central system settlement house consolidates the tapout files by home network. The central system settlement house sends the consolidated tapout files to the respective home network.

The present invention provides a system and method of billing a subscriber for roaming communications services when the subscribers home network and the roaming network do not have a roaming agreement. The roaming network rating the communication. The roaming network sends a tapout file to an intelligent roaming system. The secondary IMSI is translated to the primary IMSI. The intelligent roaming system regenerates the tapout file. The intelligent roaming system sends the regenerated tapout file to the appropriate home network.

Additional advantages and novel features of both embodiments of the invention will be set forth in part in the description that follows, and in part will become more apparent to those skilled in the art upon examination of the following or upon learning by the practice of the invention.

Other features of the present invention will become apparent from the following detailed description considered in connection with the accompanying drawings which disclose multiple embodiments of the present invention. It should be understood, however, that the figures are designed for the purpose of illustration only and not as a definition of the limits of the invention. Additional advantages and novel features of the invention will also become apparent to those skilled in the art upon examination of the following or upon learning by practice of the invention.

DETAILED DESCRIPTION OF THE INVENTION

It is known in the art that roaming service is a good source of revenue for the operators. Accordingly, it is beneficial for the operators to maximize the number of roaming agreements in order to have an opportunity to enhance revenue.

The present invention provides a system that enables international roaming across networks without agreements between individual network operators, thereby increasing roaming access and potential revenue generated from roaming access.

A detailed description of two exemplary embodiments of the present invention is provided.

Multiple IMSI

Figure 1:
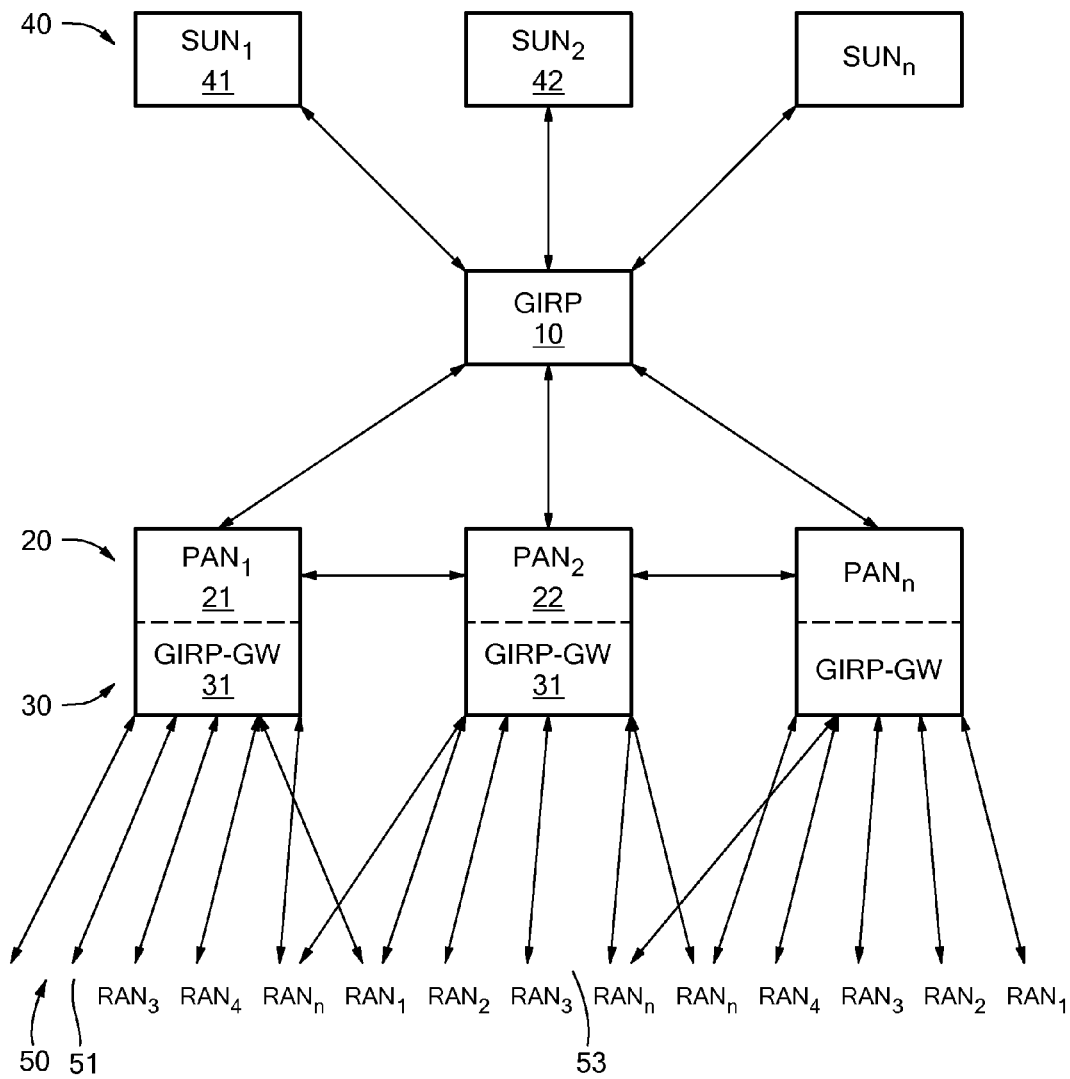
FIG. 1 illustrates an example of the interconnections between various network operators provided by one embodiment the present invention.

The multiple IMSI embodiment of the present invention provides a system that uses multiple IMSIs to enable local, regional, national and international roaming across networks, thereby increasing roaming access and potential revenue generated from roaming access. One example of the multiple IMSI embodiment is shown in FIG. 1. In FIG. 1, each of a plurality of subscriber networks 40 is connected to a centralized system 10. Typically, this connection is at the subscriber network's mobile switching center (MSC). The centralized system 10 is also connected to a plurality of alliance networks 20. Typically, this connection occurs at the alliance network's mobile switching center (MSC). Each of the alliance networks 20 is connected to a plurality of member networks 50. Typically, this connection occurs between the alliance network's mobile switching center (MSC) and the member network's MSC. However, other connection would not impact this invention.

For example, this embodiment enables a subscriber to a first subscriber network 41 to roam into the geographic area covered by a first member network 51 of a first alliance network 21 or into a second member network 53 of a second alliance network 22. Similarly, a subscriber to a second subscriber network 42 may roam into any of member networks 50. Further, a subscriber of the first member network 51 may roam into the geographic area covered by the first subscriber network 41 or the geographic area covered by a second subscriber network 42.

Consequently, the present invention allows a network operator to easily access global roaming services using a series of coordinated mobile wireless communication networks (i.e., the networks communicating with centralized system 10). In one variation of the multiple IMSI embodiment, the coordinated mobile wireless communication networks include multiple alliance networks 20 (i.e., networks that have established partnerships or bilateral agreements to provide roaming services to member networks). These networks may be national or international in area covered or served. Subscribers of a home network that is a member of a roaming alliance can roam into any member network at one of the alliance networks using centralized system 10 and access the communication network.

The implementation of the present invention at one central location allows operators to establish a Signaling System 7 ("SS7") link with the centralized system 10. In one variation of the multiple IMSI embodiment of the present invention, the centralized system can be decentralized (e.g. implemented in a plurality of locations). Secondary systems may serve as back-up systems in case the primary system is out of operation or is unable to meet usage demands. By using present invention, there is no need to establish individual roaming agreements to form a roaming network.

The system of the present embodiment uses a global roaming gateway 30 implemented or installed behind the gateway mobile switching center ("GMSC") of each of the alliance networks 20 (e.g., PAN1, PAN2 and PAN3). Additionally, one embodiment of the system and method of the present invention includes installation and use of Multiple-IMSI Subscriber Identification Module ("SIM") cards on mobile devices to provide access to international roaming and to ensure compatibility. In one variation, the SIM cards are programmed to have one primary IMSI and more than one secondary IMSI. Each secondary IMSI is associated with one of the members 50 of one of the alliance networks 20 to ensure coverage in at least one roaming network. Alternatively, the secondary IMSIs may be associated with the GMSC for one of the alliance networks 20. The SIM cards may also include the Short Message Service Center ("SMSC") addresses of the SIM cards, to provide SMS services while the subscriber is roaming in some foreign network.

As noted above, the network must have a signaling link to the centralized system. In the preferred version of this embodiment, the signaling link is a uniform signaling link. For example, a SS7 signaling link to the centralized system may be required if each operator has SS7 signaling.

The present invention operates by transmitting signals from the roaming subscriber to the centralized system 10. The centralized system 10 then forwards the signal to the roaming subscriber home network/operator. When a roaming network receives a signal from an in-roamer, the roaming service routes the message to the centralized system 10, which, in turn, routes the message to the alliance network 20 message service center (MSC). The MSC routes to the global roaming gateway platform 30 (also interchangeably herein as "gateway" or "global roaming gateway") and then the message is sent to the home MSC (also known as the "home location register" or "HLR"). For an out-roamer the message is routed through the member network 50 (roaming network) to the global roaming gateway 30. The global roaming gateway 30 routes the message to the centralized system 10 via the alliance network 20. The centralized system 10 routes the message to the home network.

According to the multiple IMSI embodiment of the present invention, the message flow occurs as follows.

In-Roamer (Subscriber of Foreign Network in Subscriber Network) Location Update

When one of the subscriber networks 40 detects an in-roamer the subscriber network visitor location register (VLR) generates a "Send Authentication/Parameters" request. The subscriber network 40 then sends the "Send Authentication/Parameters" request to a member 50 (also known interchangeably herein as a "partner") in the alliance network 20, (also known interchangeably herein as the "partner alliance network" or "PAN") through the centralized system 10 of the present invention. Depending on the IMSI series, the message is routed to one of the partner alliance networks 20. The appropriate partner alliance network 20 forwards this message to the associated global roaming gateway 30 of present invention. The gateway 30 serves as VLR and forwards this message to home network using the Mobile Global Title (MGT). When response comes from the home network, the gateway 30 forwards the response to the subscriber network VLR through the alliance network 20 and centralized system 10.

The subscriber network 40 VLR sends the "Update Location" request to the partner alliance network 20. This request is also routed to the centralized system 10 of the present invention. The centralized system 10 replaces the VLR address attached to the "update location" request with the VLR address for the centralized system 10. The modified "update location" request is then forwarded from centralized system 10 to the partner alliance network 20 where the gateway 30 replaces the centralized system VLR address with the VLR address for the appropriate gateway 30. The gateway 30 then forwards the twice modified "update location" request to the home network (in this case one of the member networks 50) using the Mobile Global Title (MGT). After the home network receives the "update location" request, the home network forwards the response to the subscriber network VLR through the gateway 30, alliance network 20 and centralized system 10.

Voice Call—In-Roamer Originated (MO)

Following a successful location update, an in-roamer can make out going calls in a manner consistent with what is generally known in the art.

Voice Call—In-Roamer Terminated (MT)

With respect to the voice calls received by the in-roamer, in one embodiment the home network home locater register (HLR) sends a "Provide Roaming Number" request to the gateway 30. The home network HLR contains the VLR address of the gateway 20. Subsequently, the gateway 30 acts as a HLR and sends the request to the centralized system 10, since the gateway 10 has the VLR address of the centralized system 10. Next, the centralized system 10 acts as HLR and forwards the request to the subscriber network 40 VLR. When centralized system 10 receives a response from the subscriber network 40, the centralized system 10 routes or forwards the response to the gateway 30. The gateway 30 then routes or forwards the response to the home network HLR. This process allows the call to be connected to the in-roamer.

Short Message (SMS-SUBMIT)

After a successful location update, an in-roamer can send a SMS message using the short message service ("SMS") (also known as "MO Forward SM"). Initially, the SMS message is sent to the centralized system 10 via the subscriber network 40. The centralized system 10 then forwards the message to the gateway 30 via the alliance network 20. The gateway 30, in turn, forwards the message to the home network SMSC, using the SMSC address. Following receipt of this message, the home network SMSC sends a response to the gateway 30. The gateway 30 forwards the message to the centralized system 10 and the centralized system 10 forwards the message to the subscriber network 40. Based on this process, in one embodiment of the present invention, the party sending the message receives a message stating "Message Sent Successfully" which is displayed on the mobile communications device.

Short Message (SMS-DELIVERY)

To deliver an SMS message to an in-roamer, the home network sends a "MT Forward SM" request to the gateway 30 because of the HLR of home network contains the VLR address of gateway 30. The gateway 30 sends the "MT Forward SM" request to the centralized system 10 via the alliance network 30. The centralized system 10, in turn, sends the "MT Forward SM" request to the subscriber network 40. After receiving acknowledgement from the subscriber network 40, the centralized system 10 contacts the gateway 30 via alliance network 20 with the return message. The gateway 30 ultimately forwards the return message to the home SMSC.

Out-Roamer (Subscriber of Subscriber Network in Foreign Network): Location Update When a subscriber of one of the subscriber networks 40 enters or is located in a foreign network (e.g., one of member networks 50 or one of the subscriber networks 40 that is not the subscriber's home network), the location update fails for the primary IMSI. Under the present invention the location update is attempted a second time, wherein the location update attempts to contact with a secondary IMSI. Alternatively, the subscriber may select a secondary IMSI provided by the present invention. When the secondary IMSI corresponding to one of the partner alliance networks 20 is selected, the foreign network's VLR confirms the selection by sending a "Send Authentication/Parameters" request. This request to the partner alliance network provides a method and a system for obtaining authentication information of the subscriber. The partner alliance network 30 routes the message to the centralized system 10, which acts like a VLR and replaces the secondary IMSI with the primary IMSI prior to contacting the subscriber's home network using MGT. After receiving the response from the subscriber's home network, the centralized system 10 forwards the response to the foreign network VLR.

The foreign network VLR sends an "Update Location" request to the partner alliance network 20. This request is routed to the gateway 30, which replaces the VLR address with its own VLR address in the location update request. The "update location" request is then forwarded to the centralized system 10 which replaces the VLR address with its own VLR address in the location update request and then forwards the message to the subscriber's home subscriber network using the MGT. After receiving the response from the home subscriber network, the centralized system 10 forwards the response to the foreign network VLR via the gateway 30 and alliance network 20.

Voice Call—Out-Roamer Originated (MO)

After a successful location update, an out-roamer is able to make out going calls in normal manner consistent with what is generally known in the art.

Voice Call—Out-Roamer Terminated (MT)

With respect to incoming calls to the out-roamer, the home subscriber network HLR sends a "Provide Roaming Number" request to centralized system 10, since the home subscriber network HLR contains the centralized system VLR address. The centralized system 10 then acts as the HLR and sends the request to the gateway 30 via the alliance network 30. The gateway 30 then assumes the role of HLR and further transmits the request to the foreign network VLR. When the gateway 30 receives a response from the foreign network, it forwards the response to the home network via the alliance network 20 and the central system 10. The call is then forwarded to the mobile station in the foreign network.

Short Message (SMS-SUBMIT)

After a successful update location, if an out-roamer sends a SMS message (e.g., MO Forward SM) the message uses the SMSC address corresponding to the appropriate IMSI. The roaming network (member network 50) sends the SMS message to the gateway 30, which replaces the SMSC address with the address of the centralized system 10. The centralized system 10 replaces the address with the home subscriber network SMSC address and forwards this SMS message to home network SMSC. After receiving the message, the home network SMSC sends a response to the centralized system 10, which forwards the response to the gateway 30 via the alliance network 20. The gateway 30 then forwards the response to the foreign network (member network 50 or remaining network). In one embodiment of the present invention, the sender receives a communication, such as "Message Sent Successfully", which is displayed on the mobile communication device.

Short Message (SMS-DELIVER)

For the SMS message to be delivered to the home subscriber of the subscriber network roaming in the foreign network (e.g., member network 50) (e.g., MT Forward SM), a delivery request is received by the centralized system 10 from the home subscriber network. This occurs because the home subscriber network HLR contains VLR address of the centralized system 10. The centralized system 10 replaces the primary IMSI with the secondary IMSI and sends the SMS message to the gateway 30, which, in turn, forwards the message to the foreign network. Thereafter, the foreign network would send the "message sent successfully" message to the home subscriber network via the gateway 30, alliance network 20 and centralized system 10.

Figure 2:
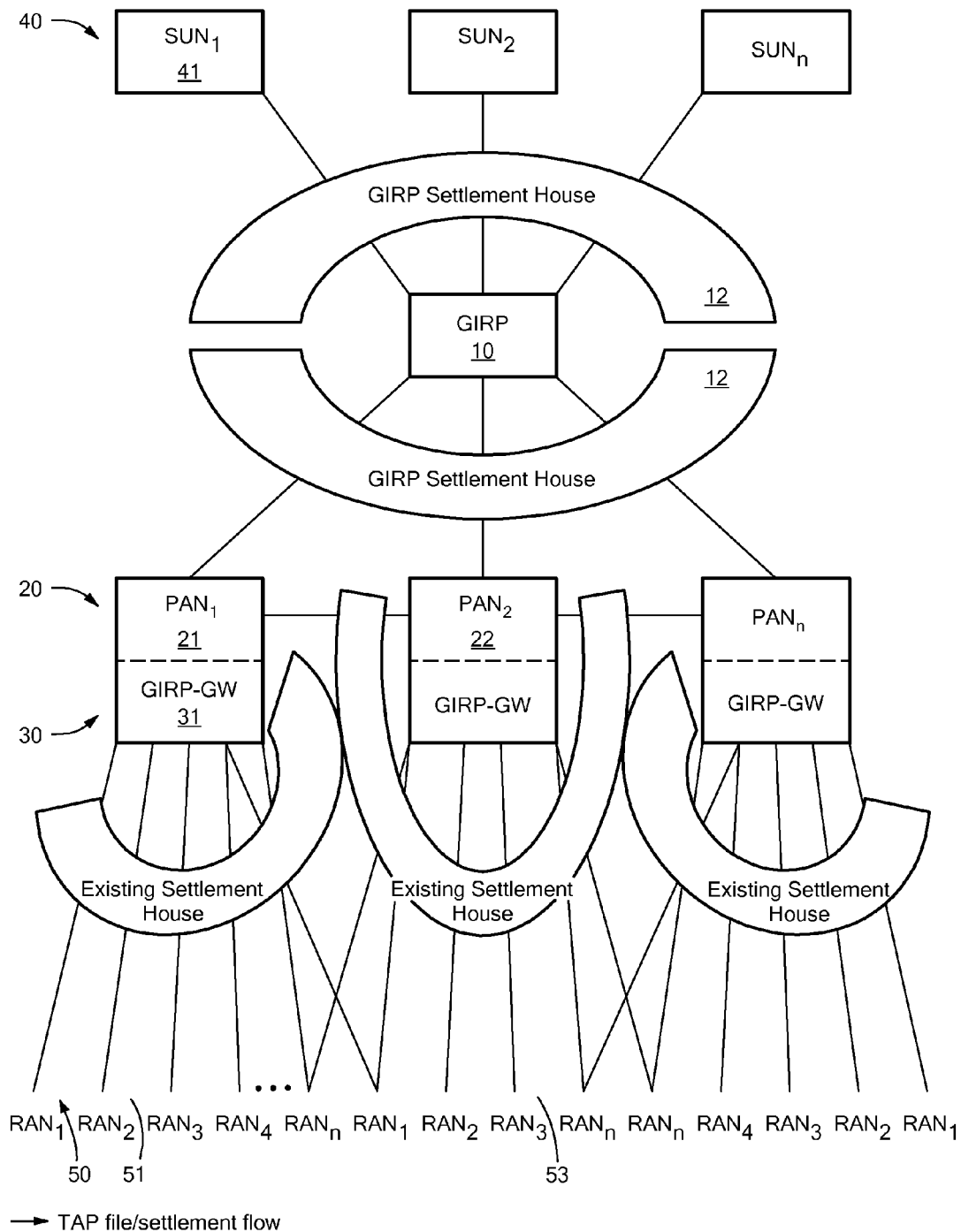
FIG. 2 illustrates an example of the settlement function that may be provided by the present invention.

Financial settlement of the roaming expenses incurred (and charged) is another component of the present invention and is illustrated in FIG. 2. FIG. 2, in accordance with one embodiment of the present invention, gives a snapshot of the deployment and functioning of the centralized system 10 settlement house 12. The subscriber networks 40 and alliance networks 20 need to enter into a Global Roaming Agreement with the centralized system 10. Financial settlements between subscriber network 40, alliance network 20 and centralized system 10 would be handled by the centralized system 10 settlement house 12. The following provides one embodiment of the financial settlement method of the present invention.

In-Roamer (Subscriber of Foreign Network in Subscriber Network)

The subscriber network 40 does the rating and sends a tapout file to the centralized system 10. The centralized system settlement house 12 would consolidate the tapout files received from the various subscriber networks 40.

Similarly, the centralized system settlement house 12 groups the respective receivables for the alliance networks 20 and sends them to the corresponding alliance network 20, 22, etc. The centralized system settlement house 12 would invoice the appropriate alliance network settlement house 60 (existing settlement house).

The alliance network settlement house 60 conducts the required IMSI translation. Alternatively, the IMSI translation can be handled by centralized system settlement house 12. The alliance network regenerates the tapout file and sends it to the appropriate member network 50. Existing settlement houses 60 handle the financial settlements between alliance network 20 and the member network 50. The member network 50, in turn, debits the subscriber.

Out-Roamer (Subscriber of Subscriber Network in Foreign Network)

The appropriate member network 50 does rating and sends the tapout file to the alliance network 20. The alliance network settlement house 60 consolidates the tapout files received from the various member networks 50.

The alliance network settlement house 60 does the required IMSI translation. Alternatively, the IMSI translation can be handled by centralized system settlement house 12. The alliance network 20 regenerates tapout file and sends to the regenerated tapout file to the centralized system 10. The centralized system settlement house 12 would consolidate the tapout files received from various alliance networks 20. The centralized system 10 sends the tapout file to the corresponding subscriber network 40. The centralized system settlement house 12 would handle the settlement with each respective subscriber network 40 and alliance network 20. The subscriber network 40, debits the subscriber. The alliance network settlement house 60 handles the settlement with the member networks 50.

The present invention presents numerous advantages unknown previously in the art. For example, the centralized system 10 of the present invention enables instant roaming capability to start up and upcoming networks. In particular the centralized system 10 provides instant roaming service globally to the new network operator, as the new operator is immediately connected with partner alliance networks 20 that have established global roaming agreements. Moreover, the present invention facilitates SMS connectivity and clearing service.

The invention also provides online, comprehensive financial settlement reports and invoices. Consequently, the invention provides the fastest and the most efficient method and approach to roaming (wherein roaming services can be provided to operators immediately after subscription in a variation of the present invention). The invention also bypasses the time consuming process of negotiating independent bilateral roaming agreements with other operators and allows subscribers of subscriber networks 40, alliance networks 20, and member networks 50 to roam in one another's network.

The invention uses/provides industry standard, compatible interfaces (e.g., Contractual/Roaming Agreement, Signaling/Technical, Billing, Inter operator tariffing), wherein the interfaces are in accordance with standard SS7 and meet the Quality of Services (QOS) levels sufficient to support or facilitate instant international roaming.

Overall, by using the present invention, wireless communication operators have the power to provide roaming services at a global level to their subscribers. This capability allows increased revenue generation, while ensuring better quality of service and support to subscribers subscribing to the platform.

Intelligence in Backbone

Figure 4:
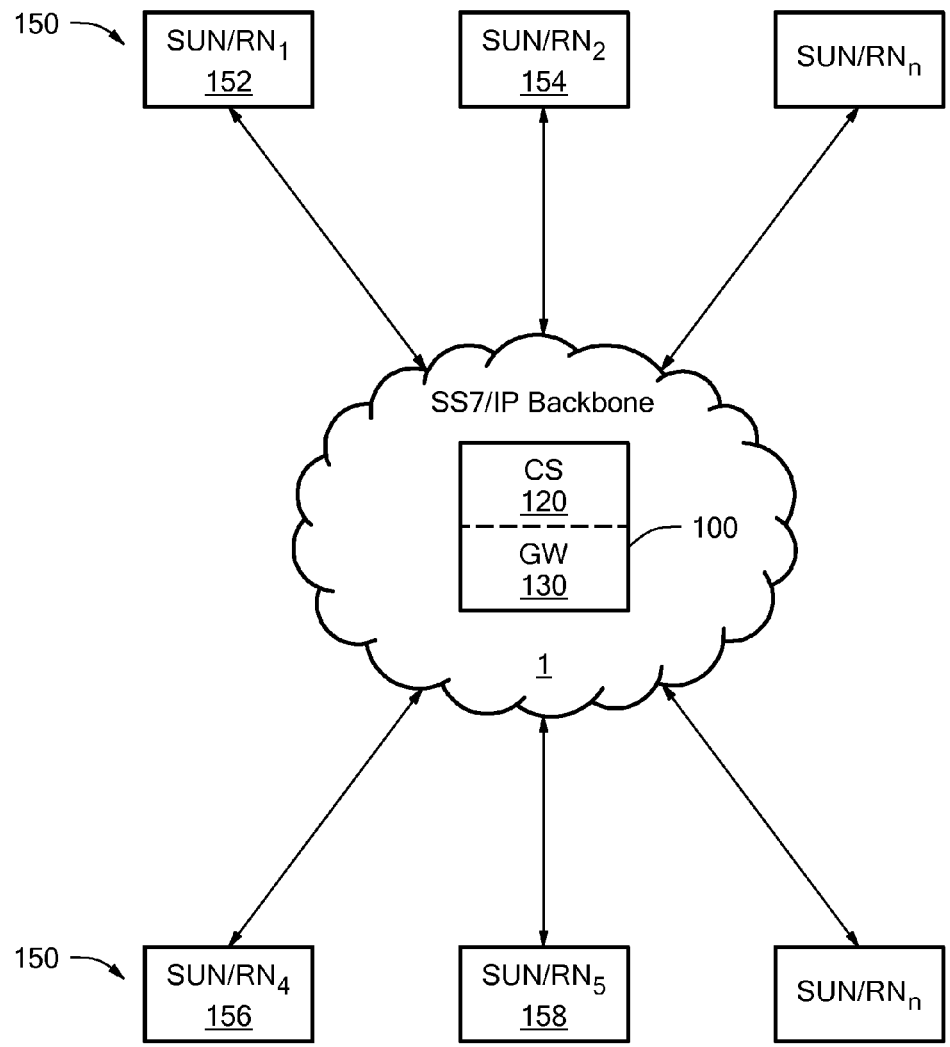
FIG. 4 illustrates an example of the interconnections between various network operators provided by a second embodiment of the present invention.

Intelligence in Backbone is the second embodiment of the present invention. One example of this embodiment is shown in FIG. 4. In this embodiment the roaming intelligence 100 is present at the central backbone 1 (SS7 or IP). The central backbone 1 serves a group of mobile networks to carry their signaling, data or voice signals. Thus, forming a huge network of operators across a wide geographical area. The operators being connected through the backbone 1.

The intelligence 100 (also referred to as "intelligent roaming system") provided at the SS7 or IP backbone 1 provides operators a system that enables international roaming across networks to the operators. Operators access the foreign networks by subscribing to the central backbone 1 (SS7 or IP) where the intelligence 100 is placed.

A subscriber's home network thereby, becomes a member of every network 150, which has subscribed to the backbone 1 (SS7 or IP) where the intelligence 100 of the current invention is placed. Consequently, there is an increase in roaming access for every new member subscribing to the central backbone carrier. Therefore, good potential revenue is generated from increased roaming access.

By using present invention, there is no need for establishing roaming agreements (bilateral or multilateral) with any other roaming network.

The present invention operates when a roaming subscriber (in roamer or out roamer) tries to communicate with (latch to) a MSC of a roaming network, which does not have any agreement with the subscribers home network. In such a case, the present invention operates to redirect the signals from the roaming network's MSC to the intelligent roaming system 100 on the central SS7 or IP backbone 1. This backbone 1 uses the gateway 130 (part of roaming intelligence 100) which on the basis of IMSI identifies the appropriate home network or MSC from the subscribed network operators, and routes the signals to the respective operator.

According to the embodiment of the present invention, the message flow occurs as follows.

In-Roamer (Subscriber of Foreign Network in Subscriber Network) Location Update

The VLR of the subscriber network 150 visited by the in-roamer sends a "Send Authentication/Parameters" request to the SS7 backbone 1. The backbone 1 forwards this request to a centralized system 120 of the intelligent roaming system 100. Depending on the IMSI series, the message is routed by the centralized system 120 over the SS7 backbone network. This routing process may also use gateway 130 (also located at the SS7 backbone). Once this is done, the roaming intelligence 100 at the SS7 backbone 1, acts as a gateway between the Home network MSC and Roaming network's MSC. Consequently, the roaming intelligence gateway 130 acts as the VLR and HLR respectively.

The gateway 130 serves as VLR and forwards this message to home network using the Mobile Global Title (MGT). When response comes from the home network, the gateway 130 forwards the response to the roaming network VLR.

The roaming network VLR then sends the "Update Location" request. This request is routed via the SS7 backbone system to the gateway 130 which replaces the VLR address attached to the "Update Location" request with its own VLR address. The modified "Update Location" request is forwarded to the home network using the MGT. When the home network receives the modified request, the home network sends a response to the roaming network VLR via the SS7 backbone 1 and gateway 130.

Voice Call In-Roamer (MO)

Following a successful location update, an in-roamer can make out going calls in a manner consistent with what is generally known in the art.

Voice Call In-Roamer (MT)

With respect to the voice calls received by the in-roamer, in one embodiment the home network HLR sends a "Provide Roaming Number" request to the gateway 130 via the backbone 1. The home network HLR contains the VLR address of the gateway. Subsequently, the gateway 130 acts as a HLR and sends the request to the subscriber network VLR. When roaming intelligence system 100 receives a response from the subscriber network, it routes the response back to the home network HLR over the backbone 1. This process allows the call to be connected to the in-roamer.

Short Message (SMS-SUBMIT)

After a successful location update, an in-roamer can send a short message service ("SMS") message (also known as "MO Forward SM") to the roaming intelligence system 100 on the backbone 1. The gateway 130 (part of the roaming intelligence system 100) forwards this messages to home network SMSC, using the SMSC address. Following receipt of this message, the home network SMSC sends a response to the gateway 130, which is forwarded to the subscriber network. Based on this process, in one embodiment of the present invention, the party sending message receives a message stating "Message Sent Successfully" which is displayed on the mobile communications device.

Short Message (SMS-DELIVERY)

To deliver an SMS message to an in-roamer, the "MT Forward SM" request is sent to the gateway 130 because of the HLR of home network contains VLR address of gateway 130. The gateway 130 sends the request to the subscriber network. After receiving acknowledgement from the subscriber network, the gateway 130 forwards the return message to the home SMSC.

Out-Roamer (Subscriber of Subscriber Network in Foreign Network): Location Update When a subscriber of subscriber network 40, 150 enters or is located in a foreign network (e.g., in another subscriber network 40, 150 that does not have a roaming agreement with the subscriber's home network) the location update fails for the IMSI. Under the present invention, the location update if it fails for the IMSI at the foreign network VLR (foreign MSC), the location update is then routed to the gateway 130 of the intelligent roaming system 100 located at the SS7 backbone. Once the signals are sent to the intelligent roaming system 100 at the SS7 backbone, the system herein acts as a gateway between the home network MSC and roaming network's MSC as VLR and HLR respectively.

The "Send Authentication/Parameters" request is then sent from the VLR of the roaming network (roaming MSC) to the gateway 130 at the SS7 backbone. The gateway 130 serves as the VLR and forwards this message to home network using the MGT. When the response comes from the home network, the gateway 130 serves as a HLR and forwards the response to the roaming network's actual VLR.

The roaming network VLR then sends the "Update Location". This request again routed to the gateway 130, which replaces the VLR address attached to the request with its own VLR address in the location update request and the response is forwarded to the home network using the MGT. When the home network receives the "Update Location", the home network forwards the response to the gateway 130 of the present invention, which in turn forwards the response to the foreign network VLR (roaming network VLR).

Voice Call—Out-Roamer (MO)

After a successful location update, an out-roamer is able to make out going calls in normal manner consistent with what is generally known in the art.

Voice Call—Out-Roamer (MT)

With respect to the incoming calls to the out-roamer, the home network HLR sends "Provide Roaming Number" request to the gateway 130 at the SS7 backbone, since the home network HLR has the gateway 130 VLR address. The gateway 130 at the SS7 backbone acts as the HLR and sends the "Provide Roaming Number" request to the roaming network VLR. When the gateway 130 receives a response from the roaming network (foreign network), it forwards the call to mobile station in the roaming network.

Short Message (SMS-SUBMIT)

After the successful update location, if an out roamer sends a SMS message (e.g., MO Forward SM), the message uses the SMSC address corresponding to the appropriate IMSI. As a part of operation of the invention, the MSC's (i.e. networks 150) subscribed to the SS7 backbone will be enabled to route all the messages with unknown or unhandled IMSI's to the gateway 130 of the SS7 backbone.

The gateway 130 system replaces the address with the subscriber network SMSC address and forwards this SMS message to the home network SMSC. After receiving the message, the home network SMSC sends a response to the gateway 130, which forwards the response to the roaming network. In one embodiment of the present invention, the sender receives a communication, such as "Message Sent Successfully", which is displayed on the mobile communication device.

Short Message (SMS-DELIVER)

For the SMS message to be delivered to the subscriber of the home network roaming in the roaming network (e.g., MT Forward SM), a request is received by the gateway 130 at the SS7 backbone system. This occurs because the home network HLR contains VLR address of the gateway 130. The gateway 130 identifies the subscribers IMSI among its subscribed operators and forwards the SMS message to the roaming network VLR. The roaming network forwards the SMS message to the subscriber.

Financial settlement of the roaming expenses incurred (and charged) is another component of the present invention. The following provides one embodiment of the financial settlement method of the present embodiment for both in roamers as well as out roamers.

The roaming network does the rating and sends tapout file to the Intelligent roaming system 100 located at the SS7 backbone. The Intelligent roaming settlement house would consolidate the tapout files received from the various networks 150. The intelligent roaming system 100 (centralized system 10) settlement house would handle the settlement with each respective network. The home network, in turn, debits the subscriber.

Both options of the present invention provide numerous advantages unknown previously in the art. For example, the centralized system of the present invention enables instant roaming capability to the start up and upcoming networks. In particular, the centralized system 10 provides instant roaming service globally to the new network operators, as the new operator is immediately connected with the partner alliance networks that have established global roaming tie-ups as discussed above for the multiple IMSI embodiment of the invention.

More advantageously the Intelligence in Backbone embodiment provides roaming with the numerous operator networks over the globe which are a part of the same SS7 backbone which is enabled with the present invention.

Moreover, both embodiments of the present invention: facilitate SMS inter-working and clearing service; provide online, comprehensive financial settlement reports and invoices; and provide a fast and efficient method and approach to roaming (wherein roaming services can be provided to operators immediately after subscription in a variation of the present invention).

Both embodiments also bypass the time consuming process of negotiating independent bilateral or multilateral roaming agreements with operators. Both embodiments also allow subscribers of subscriber networks, alliance networks, and member networks to roam in one another's networks.

Both embodiments provide industry standard, compatible interfaces (e.g., Contractual/Roaming Agreement, Signaling/Technical, Billing, Inter operator tariffing), wherein the interfaces are in accordance with standard SS7 and meet the Quality of Services (QOS) levels sufficient to support or facilitate instant international roaming.

Overall, the present invention provides wireless communication operators the power to provide roaming services at a global level to their subscribers instantly. This capability allows increased revenue generation, while ensuring better quality of service and support to subscribers of networks subscribing to the system and method of the present invention.

Example Processing System Components and Functionality

Figure 3:
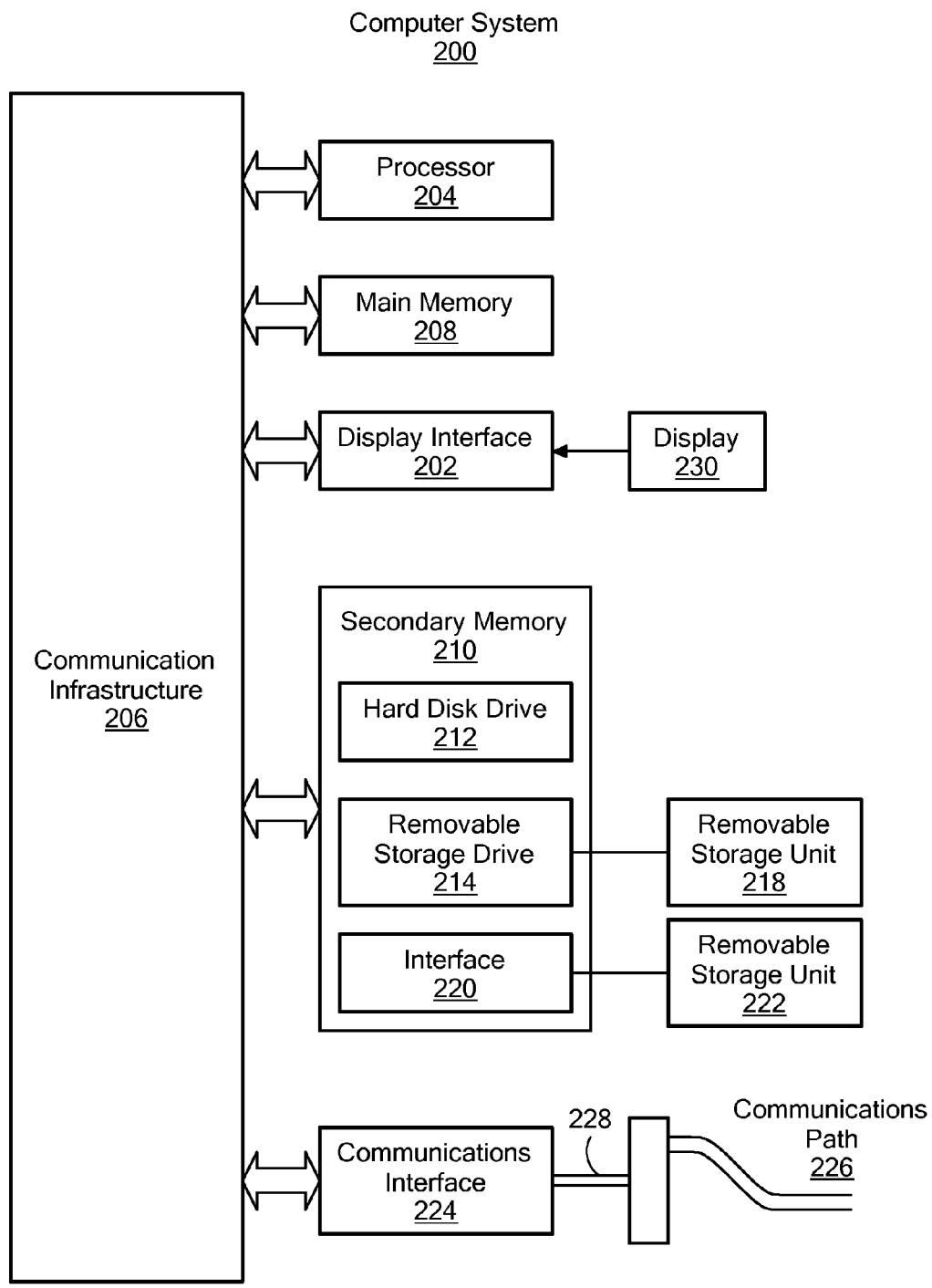
FIG. 3 presents an exemplary system diagram of various hardware components and other features in accordance with an embodiment of the present invention.

The present invention may be implemented using hardware, software, network equipment, or a combination thereof, and may be implemented in one or more computer systems or other processing systems. In one embodiment, the invention is directed toward one or more computer systems capable of carrying out the functionality described herein. An example of such a computer system is shown in FIG. 3.

Computer system 200 includes one or more processors, such as processor 204. The processor 204 is connected to a communication infrastructure 206 (e.g., a communications bus, cross-over bar or network). Various software embodiments are described in terms of this exemplary computer system. After reading this description, it will become apparent to a person skilled in the relevant art(s) how to implement the invention using other computer systems and/or architectures.

Computer system 200 can include a display interface 202 that forwards graphics, text and other data from the communication infrastructure 206 (or from a frame buffer not shown) for display on the display unit 230. Computer system 200 also includes a main memory 208, preferably a random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well-known manner. Removable storage unit 218, represents a floppy disk, magnetic tape, optical disk, etc., which is read by, and written to, removable storage drive 214. As will be appreciated, the removable storage unit 218 includes a computer usable storage medium having stored therein computer software and/or data.

In alternative embodiments, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 214, a hard disk installed in hard disk drive 212 and signals 228. These computer program products provide software to the computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention as discussed herein. In particular, the computer programs, when executed, enable the processor 204 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212 or communications interface 224. The control logic (software), when executed by the processor 204, causes the processor 204 to perform the functions of the invention as described herein. In another embodiment, the invention is implemented primarily in hardware using, for example, hardware components, such as application-specific integrated circuits (ASICs). Implementation of the hardware state machine so as to perform the functions described herein will be apparent to persons skilled in the relevant art(s).

In yet another embodiment, the invention is implemented using a combination of both hardware and software.

Example embodiments of the present invention have now been described in accordance with the above advantages. It will be appreciated that these examples are merely illustrative of the invention. Many variations and modifications will be apparent to those skilled in the art.

We claim:

1. A method of permitting roaming across mobile networks, comprising the steps of:
   receiving, at a central computer system, an authentication message from one of a plurality of roaming networks in which a subscriber of a home network is roaming;
   authenticating, at the central computer system using the authentication message, that said one of the plurality of roaming networks has a roaming relationship with the central computer system;
   responsive to the authentication of said one of the plurality of roaming networks, forwarding, by the central computer system, the authentication message to the home network via an alliance network with which the central computer system has a roaming relationship, thereby permitting verification that a roaming transaction involving the subscriber is a permissible roaming transaction;
   receiving, at the central computer system from the home network via the alliance network, an indication that the authentication message was received by the home network;
   forwarding, by the central computer system to said one of the plurality of roaming networks, the indication that the authentication message was received by the home network,
   whereby, responsive to receipt of the indication that the authentication message was received by the home network at said one of the plurality of roaming networks, roaming calls are enabled for the subscriber within said one of the plurality of roaming networks;
   receiving, at the central computer system, an update location request from said one of the plurality of roaming networks;
   replacing, by the central computer system, an address in the update location request with a visitor locator register (VLR) address of the central computer system to produce a modified update location request;
   forwarding, by the central computer system via the alliance network, the modified update location request to a roaming gateway associated with the alliance network;
   replacing, by the roaming gateway, the VLR address of the central computer system contained in the modified update location request with a VLR address of the roaming gateway to produce a twice modified update location request;
   forwarding, by the roaming gateway, the twice modified update location request to the home network;
   receiving, at the central computer system, an update location response from the home network, the update location response being sent, by the home network, to the central computer system via the roaming gateway and the alliance network in response to receipt of the twice modified update location request at the home network;
   forwarding, by the central computer system, the update location response to said one of the plurality of roaming networks;
   receiving, at the central computer system, a provide roaming number request from the home network,
   wherein the provide roaming number request is sent by the home network to the central computer system via the roaming gateway, acting as a home locator register (HLR), and the alliance network in response to receipt of an incoming call for the subscriber at the home network;
   sending the provide roaming number request from the central computer system, acting as the HLR, to said one of the plurality of roaming networks;
   receiving, at the central computer system, a provide number response to the provide roaming number request from said one of the plurality of roaming networks, the provide number response being sent by said one of the plurality of roaming networks to the central computer system via the roaming gateway and the alliance network; and sending, by the central computer system, the provide number response to the provide roaming number request to the home network, whereby the subscriber is enabled to connect to the incoming call.

2. A method of permitting roaming across mobile networks, comprising the steps of:

receiving, at a central computer system, an authentication message from one of a plurality of roaming networks in which a subscriber of a home network is roaming;

authenticating, at the central computer system using the authentication message, that said one of the plurality of roaming networks has a roaming relationship with the central computer system;

responsive to the authentication of said one of the plurality of roaming networks, forwarding, by the central computer system, the authentication message to the home network via an alliance network with which the central computer system has a roaming relationship, thereby permitting verification that a roaming transaction involving the subscriber is a permissible roaming transaction;

receiving, at the central computer system from the home network via the alliance network, an indication that the authentication message was received by the home network;

forwarding, by the central computer system to said one of the plurality of roaming networks, the indication that the authentication message was received by the home network, whereby, responsive to receipt of the indication that the authentication message was received by the home network at said one of the plurality of roaming networks, roaming calls are enabled for the subscriber within said one of the plurality of roaming networks;

receiving, at the central computer system, an update location request from said one of the plurality of roaming networks;

replacing, by the central computer system, an address in the update location request with a visitor locator register (VLR) address of the central computer system to produce a modified update location request;

forwarding, by the central computer system via the alliance network, the modified update location request to a roaming gateway associated with the alliance network;

replacing, by the roaming gateway, the VLR address of the central computer system contained in the modified update location request with a VLR address of the roaming gateway to produce a twice modified update location request;

forwarding, by the roaming gateway, the twice modified update location request to the home network;

receiving, at the central computer system, an update location response from the home network, the update location response being sent, by the home network, to the central computer system via the roaming gateway and the alliance network in response to receipt of the twice modified update location request at the home network;

forwarding, by the central computer system, the update location response to said one of the plurality of roaming networks;

receiving, at the central computer system, a mobile terminated (MT) Forward short message (SM) request from the home network via the roaming gateway, acting as a home locator register (HLR), and the alliance network, the MT Forward SM request being sent by the home network to the central computer system in response to receipt of an incoming short message service (SMS) message for the subscriber;

sending, by the central computer system acting as the HLR, the MT Forward SM request to said one of the plurality of roaming networks, wherein the SMS message is delivered to the subscriber;

receiving, at the central computer system, an SMS response to the MT Forward SM request from said one of the plurality of roaming networks; and sending, by the central computer system, the SMS response to the MT Forward SM request to the home network via the alliance network and the roaming gateway.

3. A method of permitting roaming across mobile networks, comprising the steps of:

receiving, at a central computer system via an alliance network, an authentication message from one of a plurality of roaming networks in which a subscriber of a home network is roaming, the authentication message using a secondary international mobile station identifier (IMSI) of the subscriber;

authenticating, at the central computer system using the authentication message, that the alliance network has a roaming relationship with the central computer system;

responsive to the authentication of the alliance network, replacing, by the central computer system, the secondary IMSI in the authentication message with a primary IMSI of the subscriber, and forwarding, by the central computer system, the authentication message to the home network, thereby permitting verification that a roaming transaction involving the subscriber is a permissible roaming transaction;

receiving, at the central computer system from the home network, an indication that the authentication message was received by the home network;

forwarding, by the central computer system to said one of the plurality of roaming networks via the alliance network, the indication that the authentication message was received by the home network, whereby, responsive to receipt of the indication that the authentication message was received by the home network at said one of the plurality of roaming networks, roaming calls are enabled for the subscriber within said one of the plurality of roaming networks;

receiving, at the central computer system, an update location request from said one of the plurality of roaming networks, the update location request being sent by said one of the plurality of roaming networks to the central computer system via the roaming gateway and the alliance network;

replacing, by the central computer system, an address in the update location request with a visitor locator register (VLR) address of the central computer system to produce a modified update location request;

forwarding, by the central computer system, the modified update location request to the home network;

receiving, at the central computer system, an update location response from the home network, the update location response being sent by the home network to the central computer system in response to receipt of the modified update location request at the home network;

forwarding, by the central computer system, the update location response to said one of the plurality of roaming networks via the alliance network and the roaming gateway;

receiving, at the central computer system, a provide roaming number request from the home network, the provide roaming number request being sent by the home network to the central computer system in response to receipt of an incoming call for the subscriber;

sending the provide roaming number request from the central computer system, acting as a home locator register (HLR), to the alliance network, the provide roaming number request being sent from the alliance network to said one of the plurality of roaming networks via the roaming gateway acting as the HLR;

receiving, at the central computer system, a provide number response to the provide roaming number request from said one of the plurality of roaming networks, the provide number response being sent to the central computer system by said one of the plurality of roaming networks via the roaming gateway and the alliance network; and sending, by the central computer system, the provide number response to the home network, whereby the subscriber is enabled to connect to the incoming call.

4. A method of permitting roaming across mobile networks, comprising the steps of:

receiving, at a central computer system via an alliance network, an authentication message from one of a plurality of roaming networks in which a subscriber of a home network is roaming, the authentication message using a secondary international mobile station identifier (IMSI) of the subscriber;

authenticating, at the central computer system using the authentication message, that the alliance network has a roaming relationship with the central computer system;

responsive to the authentication of the alliance network, replacing, by the central computer system, the secondary IMSI in the authentication message with a primary IMSI of the subscriber, and forwarding, by the central computer system, the authentication message to the home network, thereby permitting verification that a roaming transaction involving the subscriber is a permissible roaming transaction;

receiving, at the central computer system from the home network, an indication that the authentication message was received by the home network;

forwarding, by the central computer system to said one of the plurality of roaming networks via the alliance network, the indication that the authentication message was received by the home network, whereby, responsive to receipt of the indication that the authentication message was received by the home network at said one of the plurality of roaming networks, roaming calls are enabled for the subscriber within said one of the plurality of roaming networks;

receiving, at the central computer system, an update location request from said one of the plurality of roaming networks, the update location request being sent by said one of the plurality of roaming networks to the central computer system via the roaming gateway and the alliance network;

replacing, by the central computer system, an address in the update location request with a visitor locator register (VLR) address of the central computer system to produce a modified update location request;

forwarding, by the central computer system, the modified update location request to the home network;

receiving, at the central computer system, an update location response from the home network, the update location response being sent by the home network to the central computer system in response to receipt of the modified update location request at the home network;

forwarding, by the central computer system, the update location response to said one of the plurality of roaming networks via the alliance network and the roaming gateway;

receiving, at the central computer system, a mobile terminated (MT) Forward short message (SM) request from the home network, the MT Forward SM request being sent by the home network to the central computer system in response to receipt of an incoming short message service (SMS) message for the subscriber;

sending the MT Forward SM request from the central computer system, acting as a home locator register (HLR), to the alliance network, the MT Forward SM request being sent from the alliance network to said one of the plurality of roaming networks via the roaming gateway acting as the HLR, wherein the SMS message is delivered to the subscriber;

receiving, at the central computer system, an SMS response to the MT Forward SM request, the SMS response being sent by said one of the plurality of roaming networks to the central computer system via the roaming gateway and the alliance network; and forwarding, by the central computer system, the SMS response to the home network.

5. A method of permitting roaming across mobile networks, comprising the steps of:

forwarding, from a roaming network in which a subscriber of a home network is roaming, an authentication message to the home network via a central computer system, an alliance network, and a roaming gateway, the roaming gateway being associated with the alliance network and in communication with a plurality of member networks, the alliance network having a roaming relationship with each of the plurality of member networks, the plurality of member networks including the home network;

forwarding, from the home network, an acknowledgement to the authentication message to the roaming network via the roaming gateway, the alliance network, and the central computer system;

responsive to receipt of the acknowledgement to the authentication message at the roaming network, forwarding, from the roaming network, an update location request to the central computer system;

replacing, by the central computer system, an address in the update location request with a visitor locator register (VLR) address of the central computer system to produce a modified update location request;

forwarding, by the central computer system, the modified update location request to the roaming gateway via the alliance network;

replacing, by the roaming gateway, the VLR address of the central computer system contained in the modified update location request with a VLR address of the roaming gateway to produce a twice modified update location request;

forwarding, by the roaming gateway, the twice modified update location request to the home network; and responsive to receipt of the twice modified update location request at the home network, forwarding, by the home network, an update location response to the roaming network via the roaming gateway, the alliance network, and the central computer system, receiving, at the central computer system, a provide roaming number request from the home network, wherein the provide roaming number request is sent by the home network to the central computer system via the roaming gateway, acting as a home locator register (HLR), and the alliance network in response to receipt of an incoming call for the subscriber at the home network;

sending the provide roaming number request from the central computer system, acting as the HLR, to the roaming network;

receiving, at the central computer system, a provide number response to the provide roaming number request from the roaming network, the provide number response being sent by the roaming network to the central computer system via the roaming gateway and the alliance network; and sending, by the central computer system, the provide number response to the provide roaming number request to the home network, whereby the subscriber is enabled to connect to the incoming call.

6. A method of permitting roaming across mobile networks, comprising the steps of:

receiving, at a central computer system, an authentication message from one of a plurality of roaming networks in which a subscriber of a home network is roaming;

authenticating, at the central computer system using the authentication message, that said one of the plurality of roaming networks has a roaming relationship with the central computer system;

responsive to the authentication of said one of the plurality of roaming networks, forwarding, by the central computer system, the authentication message to the home network via an alliance network with which the central computer system has a roaming relationship, thereby permitting verification that a roaming transaction involving the subscriber is a permissible roaming transaction;

receiving, at the central computer system from the home network via the alliance network, an indication that the authentication message was received by the home network;

forwarding, by the central computer system to said one of the plurality of roaming networks, the indication that the authentication message was received by the home network, whereby, responsive to receipt of the indication that the authentication message was received by the home network at said one of the plurality of roaming networks, roaming calls are enabled for the subscriber within said one of the plurality of roaming networks;

receiving, at the central computer system, an update location request from said one of the plurality of roaming networks;

replacing, by the central computer system, an address in the update location request with a visitor locator register (VLR) address of the central computer system to produce a modified update location request;

forwarding, by the central computer system via the alliance network, the modified update location request to a roaming gateway associated with the alliance network;

replacing, by the roaming gateway, the VLR address of the central computer system contained in the modified update location request with a VLR address of the roaming gateway to produce a twice modified update location request;

forwarding, by the roaming gateway, the twice modified update location request to the home network;

receiving, at the central computer system, an update location response from the home network, the update location response being sent, by the home network, to the central computer system via the roaming gateway and the alliance network in response to receipt of the twice modified update location request at the home network; and forwarding, by the central computer system, the update location response to said one of the plurality of roaming networks.

7. A method of permitting roaming across mobile networks, comprising the steps of:

receiving, at a central computer system via an alliance network, an authentication message from one of a plurality of roaming networks in which a subscriber of a home network is roaming, the authentication message using a secondary international mobile station identifier (IMSI) of the subscriber;

authenticating, at the central computer system using the authentication message, that the alliance network has a roaming relationship with the central computer system;

responsive to the authentication of the alliance network, replacing, by the central computer system, the secondary IMSI in the authentication message with a primary IMSI of the subscriber, and forwarding, by the central computer system, the authentication message to the home network, thereby permitting verification that a roaming transaction involving the subscriber is a permissible roaming transaction;

receiving, at the central computer system from the home network, an indication that the authentication message was received by the home network;

forwarding, by the central computer system to said one of the plurality of roaming networks via the alliance network, the indication that the authentication message was received by the home network, whereby, responsive to receipt of the indication that the authentication message was received by the home network at said one of the plurality of roaming networks, roaming calls are enabled for the subscriber within said one of the plurality of roaming networks;

receiving, at the central computer system, an update location request from said one of the plurality of roaming networks, the update location request being sent by said one of the plurality of roaming networks to the central computer system via the roaming gateway and the alliance network;

replacing, by the central computer system, an address in the update location request with a visitor locator register (VLR) address of the central computer system to produce a modified update location request;

forwarding, by the central computer system, the modified update location request to the home network;

receiving, at the central computer system, an update location response from the home network, the update location response being sent by the home network to the central computer system in response to receipt of the modified update location request at the home network; and forwarding, by the central computer system, the update location response to said one of the plurality of roaming networks via the alliance network and the roaming gateway.

8. A method of permitting roaming across mobile networks, comprising the steps of:
  receiving, at an intelligent roaming system via an alliance network, an authentication message from one of a plurality of roaming networks in which a subscriber of a home network is roaming, the intelligent roaming system being integrated with a backbone network;
  authenticating, at the intelligent roaming system using the authentication message, that said one of the plurality of roaming networks is a subscriber to the backbone network;
  responsive to the authentication of said one of the plurality of roaming networks, forwarding, by the intelligent roaming system, the authentication message to the home network via the backbone network, thereby permitting verification that a roaming transaction involving the subscriber is a permissible roaming transaction;
  receiving, at the intelligent roaming system from the home network, an indication that the authentication message was received by the home network;
  forwarding, by the intelligent roaming system to said one of the plurality of roaming networks via the backbone network and the alliance network, the indication that the authentication message was received by the home network,
  whereby, responsive to receipt of the indication that the authentication message was received by the home network at said one of the plurality of roaming networks, roaming calls are enabled for the subscriber within said one of the plurality of roaming networks;
  receiving, at the intelligent roaming system, an update location request from the roaming network, the update location request being sent by the roaming network to the intelligent roaming system via a roaming gateway associated with the alliance network;
  replacing, by the intelligent roaming system, an address in the update location request with a visitor locator register (VLR) address of the intelligent roaming system to produce a modified update location request;
  forwarding, by the intelligent roaming system via the backbone network, the modified update location request to the home network;
  receiving, at the intelligent roaming system, an update location response from the home network, the update location response being sent, by the home network, to the intelligent roaming system in response to receipt of the modified update location request at the home network; and
  forwarding, by the intelligent roaming system via the backbone network, the update location response to the roaming network via the alliance network and the roaming gateway.

9. The method of claim 8 further including:
  receiving, at the intelligent roaming system, an update location request from the roaming network;
  replacing, by the intelligent roaming system, an address in the update location request with a visitor locator register (VLR) address of the intelligent roaming system to produce a modified update location request;
  forwarding, by the intelligent roaming system via the backbone network, the modified update location request to the home network;
  receiving, at the intelligent roaming system, an update location response from the home network, the update location response being sent, by the home network, to the intelligent roaming system in response to receipt of the modified update location request at the home network; and
  forwarding, by the intelligent roaming system via the backbone network, the update location response to the roaming network.

10. The method of claim 9 further comprising:
  receiving, at the intelligent roaming system, a provide roaming number request from the home network, the provide roaming number request being sent by the home network to the intelligent roaming system in response to receipt of an incoming call for the subscriber;
  sending the provide roaming number request from the intelligent roaming system, acting as a home locator register (HLR), to the roaming network via the backbone network;
  receiving, at the intelligent roaming system, a provide number response to the provide roaming number request from the roaming network; and
  sending, by the intelligent roaming system, the provide number response to the home network via the backbone network,
  whereby the subscriber is enabled to connect to the incoming call.

11. The method of claim 9 further comprising:
  receiving, at the intelligent roaming system, a mobile terminated (MT) Forward short message (SM) request from the home network, the MT Forward SM request being sent by the home network to the intelligent roaming system in response to receipt of an incoming short message service (SMS) message for the subscriber;
  sending the MT Forward SM request from the intelligent roaming system, acting as a home locator register (HLR), to the roaming network,
  wherein the SMS message is delivered to the subscriber;
  receiving, at the intelligent roaming system, an SMS response to the MT Forward SM request from the roaming network; and
  forwarding, by the intelligent roaming system, the SMS response to the home network via the backbone network.

12. A method of permitting roaming across mobile networks, comprising the steps of:
  receiving, at an intelligent roaming system via an alliance network, an authentication message from one of a plurality of roaming networks in which a subscriber of a home network is roaming, the intelligent roaming system being integrated with a backbone network, the authentication message using a secondary international mobile station identifier (IMSI) of the subscriber;
  authenticating, at the intelligent roaming system using the authentication message, that said one of the plurality of roaming networks is a subscriber to the backbone network;
  responsive to the authentication of said one of the plurality of roaming networks, replacing, by the intelligent roaming system, the secondary IMSI in the authentication message with a primary IMSI of the subscriber, and forwarding, by the intelligent roaming system, the authentication message to the home network via the backbone network, thereby permitting verification that a roaming transaction involving the subscriber is a permissible roaming transaction;

receiving, at the intelligent roaming system from the home network, an indication that the authentication message was received by the home network;

forwarding, by the intelligent roaming system to said one of the plurality of roaming networks via the backbone network and the alliance network, the indication that the authentication message was received by the home network, whereby, responsive to receipt of the indication that the authentication message was received by the home network at said one of the plurality of roaming networks, roaming calls are enabled for the subscriber within said one of the plurality of roaming networks;

receiving, at the intelligent roaming system, an update location request from the roaming network, the update location request being sent by the roaming network to the intelligent roaming system via a roaming gateway associated with the alliance network;

replacing, by the intelligent roaming system, an address in the update location request with a visitor locator register (VLR) address of the intelligent roaming system to produce a modified update location request;

forwarding, by the intelligent roaming system via the backbone network, the modified update location request to the home network;

receiving, at the intelligent roaming system, an update location response from the home network, the update location response being sent, by the home network, to the intelligent roaming system in response to receipt of the modified update location request at the home network; and forwarding, by the intelligent roaming system via the backbone network, the update location response to the roaming network via the alliance network and the roaming gateway.

13. The method of claim 12 further including:

receiving, at the intelligent roaming system, an update location request from the roaming network;

replacing, by the intelligent roaming system, an address in the update location request with a visitor locator register (VLR) address of the intelligent roaming system to produce a modified update location request;

forwarding, by the intelligent roaming system via the backbone network, the modified update location request to the home network;

receiving, at the intelligent roaming system, an update location response from the home network, the update location response being sent, by the home network, to the intelligent roaming system in response to receipt of the modified update location request at the home network; and forwarding, by the intelligent roaming system via the backbone network, the update location response to the roaming network.

14. The method of claim 13 further comprising:

receiving, at the intelligent roaming system, a provide roaming number request from the home network, the provide roaming number request being sent by the home network to the intelligent roaming system in response to receipt of an incoming call for the subscriber;

sending the provide roaming number request from the intelligent roaming system, acting as a home locator register (HLR), to the roaming network via the backbone network;

receiving, at the intelligent roaming system, a provide number response to the provide roaming number request from the roaming network; and sending, by the intelligent roaming system, the provide number response to the home network via the backbone network, whereby the subscriber is enabled to connect to the incoming call.

15. The method of claim 13 further comprising:

receiving, at the intelligent roaming system, a mobile terminated (MT) Forward short message (SM) request from the home network, the MT Forward SM request being sent by the home network to the intelligent roaming system in response to receipt of an incoming short message service (SMS) message for the subscriber;

sending the MT Forward SM request from the intelligent roaming system, acting as a home locator register (HLR), to the roaming network, wherein the SMS message is delivered to the subscriber;

receiving, at the intelligent roaming system, an SMS response to the MT Forward SM request from the roaming network; and forwarding, by the intelligent roaming system, the SMS response to the home network via the backbone network.

\* \* \* \* \*